(12) United States Patent
Eriksen

(10) Patent No.: US 7,232,525 B2
(45) Date of Patent: Jun. 19, 2007

(54) AUTOMATIC TANK CLEANING SYSTEM

(75) Inventor: Frank Eriksen, Houston, TX (US)

(73) Assignee: M-I L.L.C., Houston, TX (US)

( * ) Notice: Subject to any disclaimer, the term of this patent is extended or adjusted under 35 U.S.C. 154(b) by 23 days.

(21) Appl. No.: 11/083,859

(22) Filed: Mar. 18, 2005

(65) Prior Publication Data

US 2005/0205477 A1 Sep. 22, 2005

Related U.S. Application Data

(60) Provisional application No. 60/554,557, filed on Mar. 19, 2004, provisional application No. 60/565,303, filed on Apr. 26, 2004, provisional application No. 60/620,377, filed on Oct. 20, 2004, provisional application No. 60/633,766, filed on Dec. 7, 2004.

(51) Int. Cl.
| | |
|---|---|
| *B01D 21/00* | (2006.01) |
| *B01D 21/26* | (2006.01) |
| *B08B 9/08* | (2006.01) |
| *C02F 1/00* | (2006.01) |
| *C02F 1/38* | (2006.01) |

(52) U.S. Cl. ............... 210/788; 210/803; 210/804; 210/805; 210/806; 210/252; 210/258; 210/259; 210/294; 210/313; 210/512.1; 210/523; 210/532.1; 134/10; 134/104.4; 134/109

(58) Field of Classification Search ............... 210/788, 210/803, 804, 805, 806, 252, 258, 259, 294, 210/304, 313, 512.1, 523, 532.1; 134/10, 134/104.4, 109

See application file for complete search history.

(56) References Cited

U.S. PATENT DOCUMENTS 4,466,154 A * 8/1984 Urbani ............... 134/104.4

OTHER PUBLICATIONS

International Preliminary Examination Report issued in International Application No. PCT/US05/009437; dated Oct. 26, 2006; 7 pages.

* cited by examiner

*Primary Examiner*—David A. Reifsnyder

(57) ABSTRACT

An automatic tank cleaning system includes a water recycling unit having a weir therein and a conically-shaped bottom, a cutting box having a portable weir therein, a hydrocyclonic separator, and a mud tank. Tank slop is pumped from the mud tank to the water recycling unit where solids collect at the bottom. The solids are removed and collected in the cutting box. Water in the recycling unit may be pumped through the hydrocyclonic separator. Solids removed by the separator are collected in the cutting box and the water is directed into a clean water compartment defined by the weir within the recycling unit. Water in the cutting box is collected by the portable weir therein and pumped to the clean water compartment. Water from the clean water compartment is pumped to one or more rotary jet heads within the mud tank. Overflow from the water recycling unit may be directed to the cutting box. A chemical inductor may be used to add cleaning chemicals to the water prior to being directed through the wash nozzle. Turbulence preventers may be included at the inlet of each flow line to prevent turbulence from occurring in the tank to which the fluid is directed.

21 Claims, 5 Drawing Sheets

AUTOMATIC TANK CLEANING SYSTEM

This application claims the benefit of U.S. Provisional Application No. 60/554,557, filed Mar. 19, 2004 and entitled, "Automatic Tank Washing Apparatus and Method of Use"; U.S. Provisional Application No. 60/565,303, filed Apr. 26, 2004 and entitled, "Automatic Tank Washing Apparatus and Method of Use"; U.S. Provisional Application No. 60/620,377, filed Oct. 20, 2004 and entitled, "Automatic Tank Cleaning System"; and U.S. Provisional Application No. 60/633,766, filed Dec. 7, 2004 and entitled, "Automatic Tank Cleaning System," the contents each of which are incorporated herein by reference. New matter has been added to this application for which priority is not claimed.

BACKGROUND OF INVENTION

Rotary drilling methods employing a drill bit and drill stems have long been used to drill wellbores in subterranean formations. Drilling fluids or muds are commonly circulated in the well during such drilling to cool and lubricate the drilling apparatus, lift cuttings out of the wellbore, and counterbalance the subterranean formation pressure encountered. Drilling fluids and muds often contain entrained solids which have been purposefully added, such as: weighting agents, such as barite, hematite, aluminite, and the like; viscosifying agents including sepolite clay, and other viscosifying clays; and fluid loose control agents, etc . . . as well as very fine solid particles generated by the drilling process. Unlike drill cuttings, these entrained solids are difficult to remove by screening. However, upon standing, the solids often settle out over long periods of time (i.e. hours to days). Thus when the used drilling fluids or muds are being stored in tanks awaiting transport for recycling, these entrained solids typically settle out into the bottom of the tank and form a dense layer of solids.

Removal of the settled entrained solids from the bottom of a tank has proven to be a difficult problem. The current state of the art is to have a crew of at least two men enter the drained tank and using high pressure washing equipment and vacuums, wash and remove via vacuum the dense layer of solids. Such operations are both time and labor intensive and involve placing people inside of large storage tanks which raises certain safety concerns. One alternative has been to use tanks with a steep conical sidewall shape which helps prevent the settling of the solids. However, such tanks are expensive and an inefficient use of space on an offshore drilling rig or drilling rig service boat.

Thus there exists an ongoing need for improvements in the apparatus and methods used to clean tanks of sediments and solids deposited in them.

SUMMARY

The present disclosure is generally directed to an apparatus and method for washing/cleaning the inside of a tank in which fluid having entrained solids have been stored. One illustrative embodiment of the present invention is a portable or permanently installed tank washing system which recovers water from slop (dirty cleaning water) by separating water, oil, and solids. The slop is directed to a water recycling unit. The solids collected in the water recycling unit are sent to a cuttings box that is temporarily modified to serve as a weir tank. In the cuttings box weir tank, water is recovered and pumped back to the water recycling unit. An overflow line from the water recycling unit is also connected to the same cutting box to prevent overfilling the tank. The same overflow line sends separated oil to the cuttings box. Water that passes under the weir in the water recycling unit is directed to one or more hydrocyclones. The purge flow from the hydrocyclone is sent to the cuttings box weir tank. The overflow from the hydrocyclone is sent to the clean water compartment of the water recycling unit. Water recovered by the water recycling unit is pumped to the tank cleaning machines via a chemical inductor where cleaning chemicals may be added. Tank cleaning machines are rotary jet heads that clean the internal surfaces of the tank.

One of skill in the art will notice that the illustrated system can be portable; it recycles the water by separating solids (barite) using hydrocyclones in line with a weir tank that also serves as a buffer tank. It uses a hydraulic portable submersible pump and a any kind of cuttings box serving as a temporary weir tank to bring back the water to the process.

Other aspects and advantages of the claimed subject matter will be apparent from the following description and the appended claims.

DETAILED DESCRIPTION

Figure 1:
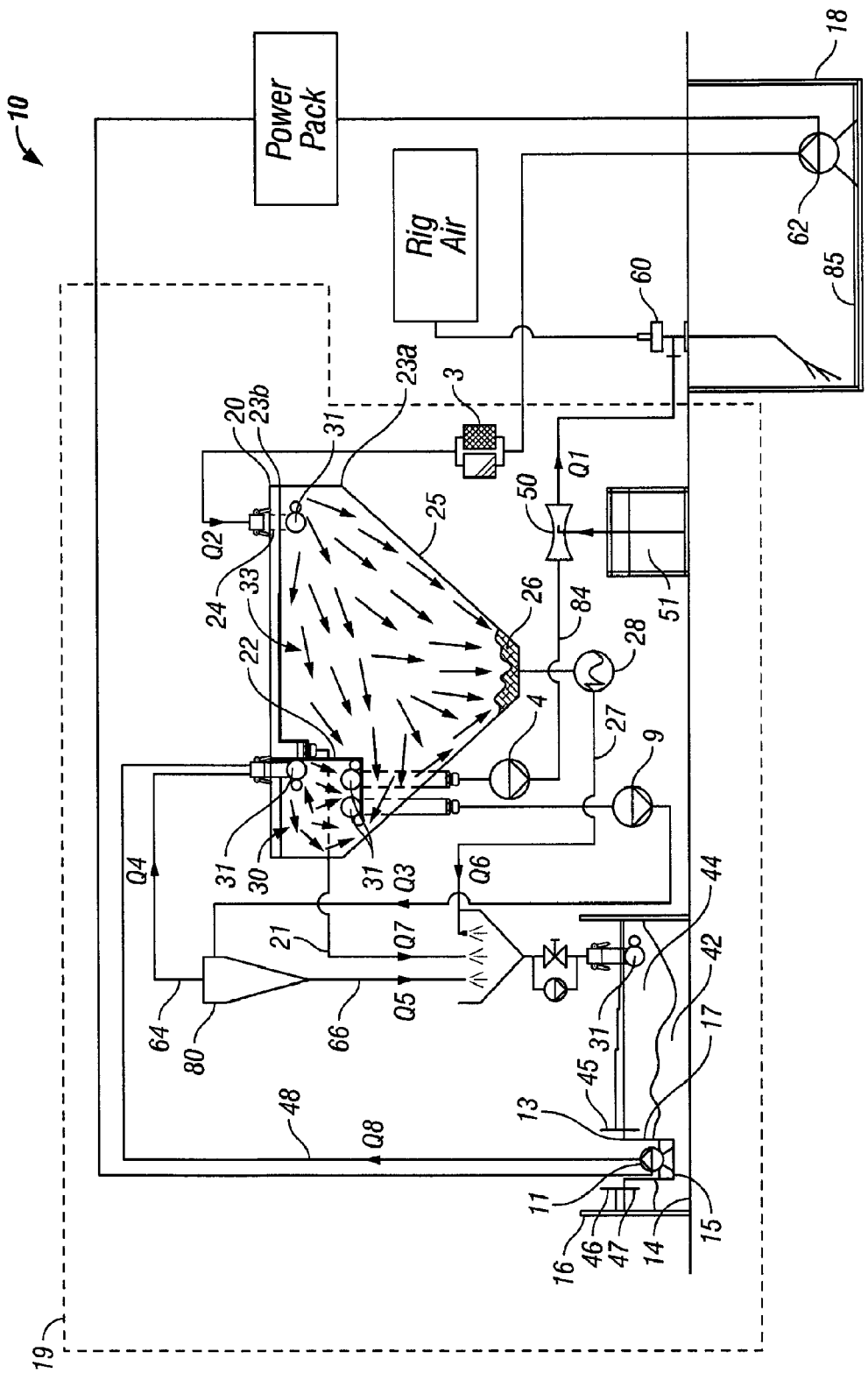
FIG. 1 is a schematic view of the automatic tank cleaning system.

The above illustrative embodiment will be better understood with reference to FIG. 1 in which the tank cleaning system 10 is schematically shown. One of skill in the art should appreciate that the schematic utilizes generally accepted representations of pumps, etc., which should be well known.

Turning now to FIG. 1, the tank cleaning system 10 includes a water recycling unit 19 and one or more rotary jet head washers 60. Discussion of the components of this closed system will begin with the rotary jet head washers 60.

Figure 3:
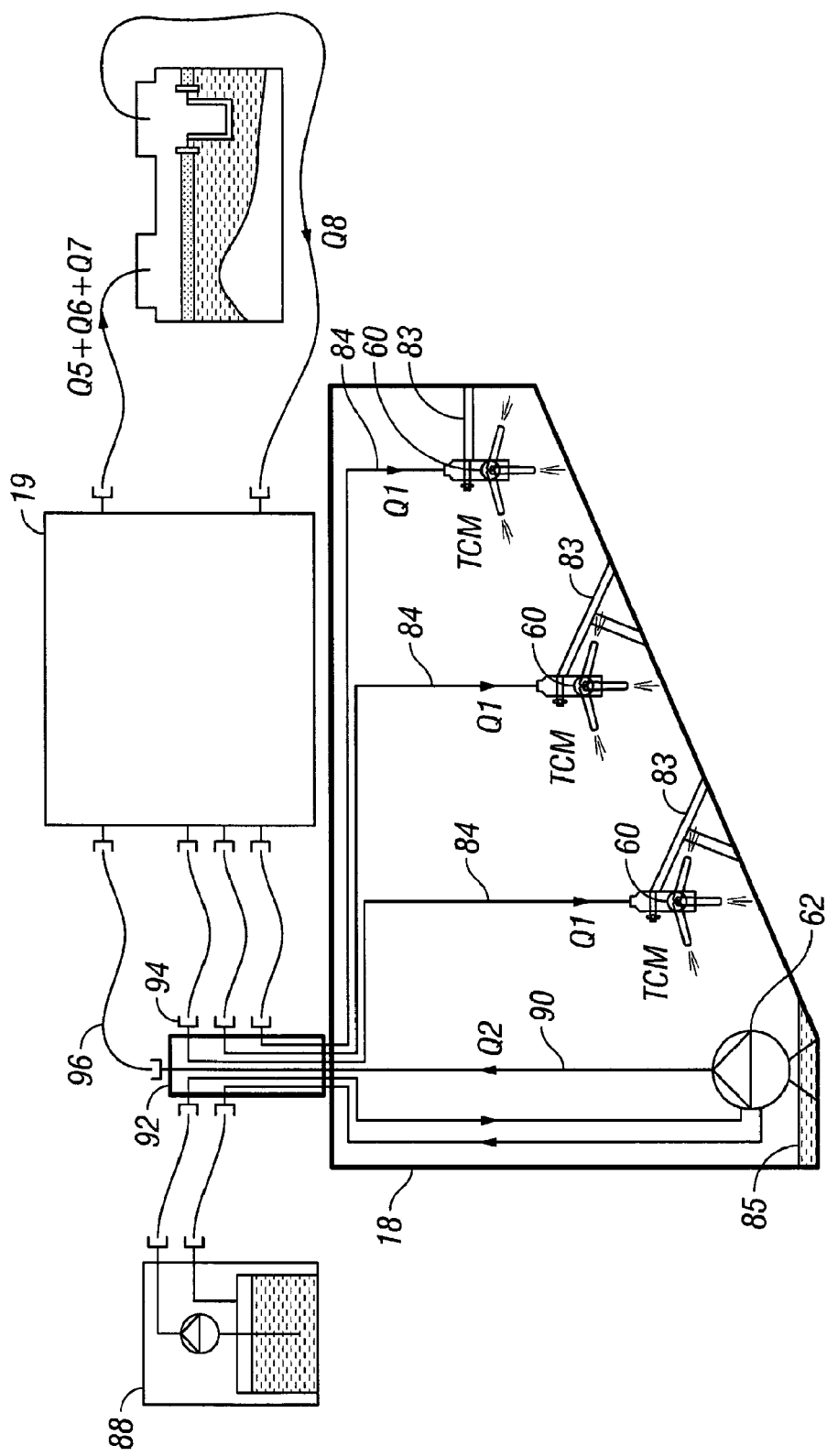
FIG. 3 is a schematic view of the skidded components of the automatic tank cleaning system.

Referring to FIG. 3, one or more of the rotary jet head washers 60 are positioned within the mud tank 18. Although shown as being fixed in position, these multi headed or single-headed nozzle rotary jet heads 60 may be lowered into the tank 18 or otherwise suspended and positioned temporarily or permanently within the tank 18 using brackets 83, stands, penetration through the deck/side of the tank or the like. The rotary jet heads 60 are supplied with pressurized wash fluid by way of the wash fluid lines 84. The rotation of the nozzles might be provided by a pneumatic motor or by a turbine in the cleaning fluid flow. As the wash fluid exits the rotary jet heads 60, the tank 18 is washed with pressurized wash fluid which dislodges any solids or sediments present in the tank 18, thus generating tank slop 85 which is a combination of solids and wash fluid. A hydraulic pump 62 connected to a hydraulic power unit 88 is used to take up the tank slop 85 and pump the combination of solids and wash fluid up the tank slop line 90. As shown, the hydraulic pump 62 is lowered into the tank 18 for use in the washing operation, but alternatively the pump 62 may be mounted either temporarily on brackets or permanently mounted in the tank 18. The tank slop line 90 carries the tank slop 85 directly to the water recycling unit 19 or through a modular fluid distribution manifold 92 which is designed with control valves (not shown) and hose connections 94, or preferably quick connect hose lines. The tank slop 85 is then pumped by way of the external slop line 96 to the water recycling unit 19.

Referring to FIG. 1, the water recycling unit 19 includes a water recycling tank 20, a cuttings box 16, and a hydrocyclone 80. The water recycling tank 20 is a type of weir tank having a weir 22 extending from a top cover (shown but not numbered) into the water recycling unit to separate a dirty water compartment 33 from a clean water compartment 30. The tank slop 85 is pumped into the top portion of the water recycling tank 20 at an inlet 24 located near the top edge distal the weir 22. A turbulence preventer 31 preferably is included near all water and slop inlets and outlets to prevent turbulence in the water recycling unit 19. Such a turbulence preventer 31 may be of any structure sufficient to dissipate the force associated with a well-defined fluid streams, including a shield, a forked nozzle to disperse the stream into multiple streams, or other type of diffuser. The water recycling tank 20 has a sloped bottom 25, which might be round, squared or rectangular. The solids 26 from the tank slop 85 fall to the bottom of the water recycling tank 20 and are gathered in the sloped bottom 25. The solids that collect at the sloped bottom 25 of the water recycling tank 20 are pumped by an auger fed progressive cavity pump 28 to the cutting box 16 through a line 27 at a volumetric flow rate $Q_6$. Alternatively, the solids may be released from the water recycling tank 20 by a valve and pumped to the cuttings box 16.

The liquid in the water recycling tank 20 that is just about to enter the clean water compartment 30 from the dirty water compartment 33 may be pumped to one or more hydrocyclones 80. Small solids that did not settle out of the fluid when introduced in the water recycling tank 20 are removed by the centrifugal force created within the hydrocyclone 80. Solids are directed by purge flow line 66 from the hydrocyclone 80 to the cuttings box 16 with a volumetric flow rate $Q_5$. The solids may be gravity fed or pumped from the hydrocyclone 80. The overflow from the hydrocyclone 80 is directed through line 64 to the clean water compartment 30 with a volumetric flow rate $Q_4$. A turbulence preventer 31, located at the inlet of the clean water compartment 30 prevents turbulence and may be a shield, a forked nozzle to disperse the stream into multiple streams, or other type of diffuser. As will be shown, the substantially solids-lean wash fluid generated by the separation units is recycled to serve as the wash fluid.

An overflow line 21 from the water recycling unit 20 directs fluid from the top portion of the water recycling tank 20 to the cuttings box 16 with a volumetric flow rate $Q_7$. The fluid through overflow line 21 may be pumped or gravity fed to the cuttings box 16. The overflow line 21 prevents spills caused by overfilling the water recycling tank 20 and directs separated oil to the cuttings box 16.

The cutting box 16 used to promote the settling of the solids 42 from the solid slurry may be any cutting box normally found onboard drilling rigs. To promote such settling of solids, a temporary and portable weir bucket 15 may be utilized. The weir bucket 15 is suspended within the cuttings box 16 above the cuttings box floor 14. As the level of solids 42 in the cuttings box 16 rises, the weir bucket 15 may be raised so that solids do not drop over the weir bucket wall 17 into the weir bucket 15. The substantially solids-lean fluid 44 in the cuttings box 16 is allowed to overflow into the weir bucket 15. An oil trap 45 surrounds an upper portion of the weir bucket 15. The oil trap 45 is spaced apart from the weir bucket 15 and preferably is substantially parallel with the weir bucket wall 17. The oil trap 45 has a top edge 46 located above the top edge 13 of the weir bucket 15, and a bottom edge 47 located below the top edge 13 of the weir bucket 15. Once the level of fluid 44 within the cuttings box 16 rises to the level of the bottom edge 47 of the oil trap 45, any oil floating atop the fluid 44 is prevented from flowing into the weir bucket 15 by the oil trap 45. Water will pass under the oil trap 45, and to the space between the oil trap 45 and the weir bucket 15 before overflowing into the weir bucket 15. From within the weir bucket 15, the substantially solids-lean fluid is pumped through fluid line 48 to the clean water compartment 30 of the water recycling tank 20 with a volumetric flow rate $Q_8$.

As previously discussed, the cuttings box 16 may be any cuttings box as used onboard a rig and as typically used to transport drill cuttings. Once a first cuttings box 16 is nearly full with solids 42, the weir bucket 15 is removed and positioned within a second, empty cuttings box 16. The second cuttings box 16 then replaces the first cuttings box 16. Valves may be used to temporarily stop or divert the flow to the first cuttings box 16 while it is replaced with the second cuttings box 16.

The flow from each flow line 21, 27, 66, may be commingled in a hopper and directed into the cuttings box 16 in a controlled stream. A turbulence preventer 31 may be included to minimize agitation to the solids 42 collected in the cuttings box 16 and prevent remixing of the solids 42 and the fluid 44. The turbulence preventer 31 may include diffusing nozzles or forked flow directors at each outlet to reduce the force associated with any one flow while maintaining the overall flow rate into the cuttings box 16.

The flow of fluid into the clean water compartment 30 comes from the weir bucket 15 at a flow rate $Q_8$ and from the hydrocyclone overflow line 64 at a flow rate $Q_4$. The total volumetric flow rate into the clean water compartment 30 is thus $Q_8+Q_4$. The flow rate of the fluid out of the clean water compartment 30 to the mud tank 18 is $Q_1$. In the water recycling tank 20, the total flow rate into the clean water compartment, $Q_8+Q_4$ typically will be greater than the flow rate $Q_1$ to the mud tank 18 resulting in positive pressure inside the clean water compartment 30. That is, the pressure inside the clean water compartment 30 will be greater than the pressure within the remainder of the water recycling tank 20. Thus, the water within the clean water compartment 30 is not contaminated with dirty fluid from within the dirty water compartment 33 of the water recycling tank 20 as long as the hydrocyclone 80 is in use.

The use of hydrocyclones 80 to remove fine solids from the water is not necessary for the operation of the automatic tank cleaning system 10, however efficiency of the system 10 is reduced when no further separation operations are included.

Figure 2:
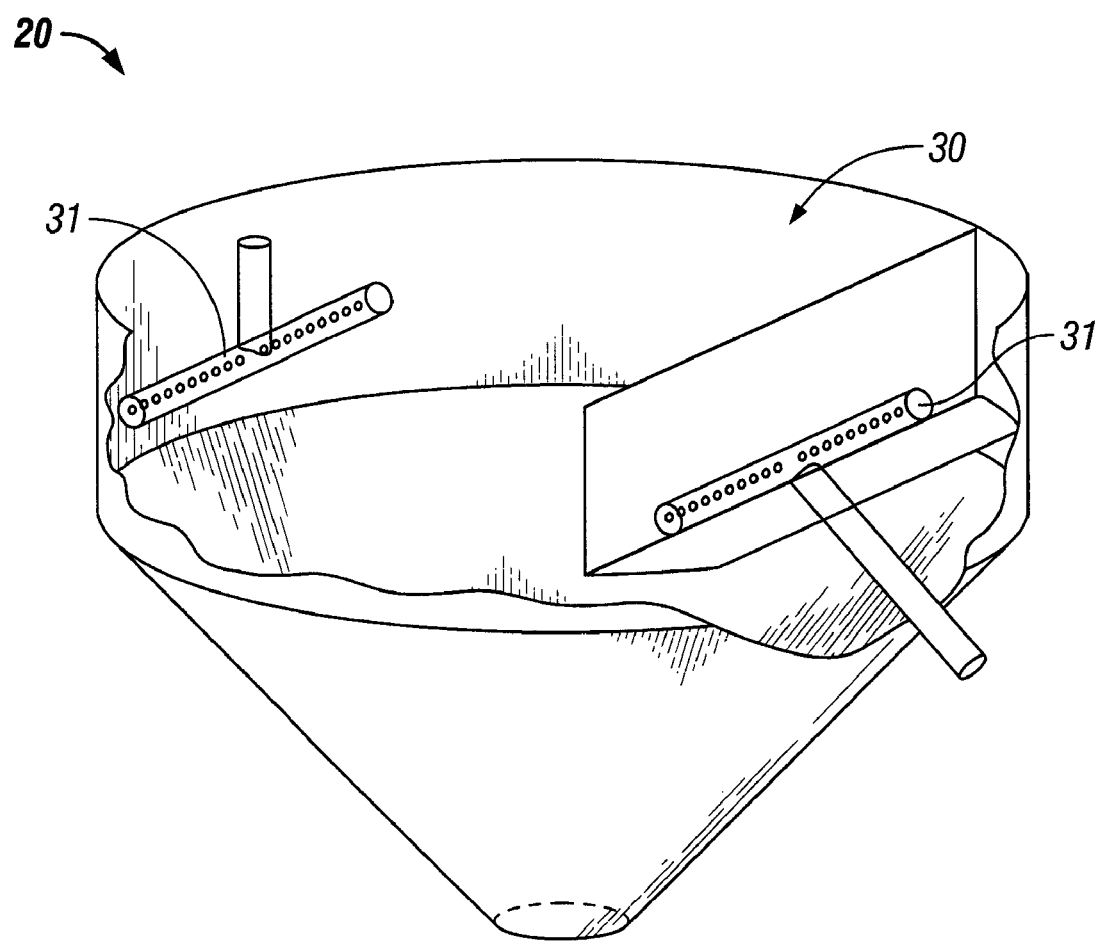
FIG. 2 is a cutaway perspective view of the water recycling unit tank.

Referring to FIGS. 1 and 2, the water recycling tank 20 includes turbulence preventers 31 at the inlet to the clean water compartment 30 from flow lines 48, 64 where the combined volumetric flow rate is $Q_4+Q_8$, the outlet to the flow line to the hydrocyclone 80 where the volumetric flow rate is $Q_3$, the outlet to flow line 84 to the mud tank nozzles 60 where the flow rate is $Q_1$, and the inlet to the water recycling tank 20 from the mud tank 18 where the flow rate is $Q_2$. In addition, turbulence preventers are included where the hydrocyclone over flow line 64, the overflow line 21 from the water recycling tank 20, and the solids discharge line 27 enter the cuttings box 16 with flow rates of $Q_5$, $Q_7$, and $Q_6$, respectively. Turbulence inside the water recycling tank 20 and the cuttings box 16, or forces that cause the water to spin inside the tank or cuttings box, reduces the efficiency of the automatic cleaning system 10. Therefore, it is important to prevent such turbulence. The turbulence preventer 31 breaks the stream from the individual flow lines.

The clean water from the clean water compartment 30 is pumped through flow line 84 with a volumetric flow rate of Q1, to one or more rotary jet heads 60 that clean the tank 18. Upon consideration of the above illustrative apparatus, one of skill in the art should understand and comprehend the method by which a tank can be quickly and easily cleaned of sediment or other solids that may be present. It also should be appreciated that a wide variety of wash fluids will be able to used with the present illustrated embodiment. Such fluids may include detergents, surfactants, antifoaming agents, suspending agents, lubricating agents (to reduce the wear caused by the flowing solids), and the like to assist in the quick and efficient cleaning of the tank. A chemical inductor 50 may be used to add such cleaning chemicals 51 to the wash water.

The water recycling tank 20 also acts as a buffer tank. The transfer of clean water from the clean water compartment 30 to the mud tank 18 and the return of slop, or dirty water, from the mud tank 18 to the water recycling tank 20 is not instantaneous. In addition to the time required for the fluid to cycle from the mud tank 18 to the water recycling tank 20, solids in the mud tank 18 can trap water and further delay the return of slop to the water recycling unit tank 20. The buffer capacity compensates for this delay of return.

The water recycling tank 20 has a minimum operational level 23a and a maximum operational level 23b. The minimum operational level 23a is located slightly above the outlet to flow line 84 to the mud tank 18. When the fluid level within the water recycling tank 20 drops below the minimum operational level 23a, the flow through flow line 84 will stop. When the fluid level within the water recycling tank 20 raises above the maximum operational level 23b, the fluid will flow into overflow line 21 to the cuttings box 16. The overflow line 21 will direct oil that has separated from the water in the dirty water compartment to the cuttings box 16.

Upon reflection, one of skill in the art will appreciate that with a system as described herein, a wide variety of tanks, specifically mud tanks can be cleaned automatically, faster, safer and with less people than using manual labor. Further it will be appreciated that the disclosed system will reduce or eliminate confined space entry, which is required under the current state of the art practices. In addition it will be appreciated by such a skilled artisan that the disclosed systems and methods will reduce the quantity of waste generated in the cleaning process as compared to other state of the art apparatus and methods.

Figure 4:
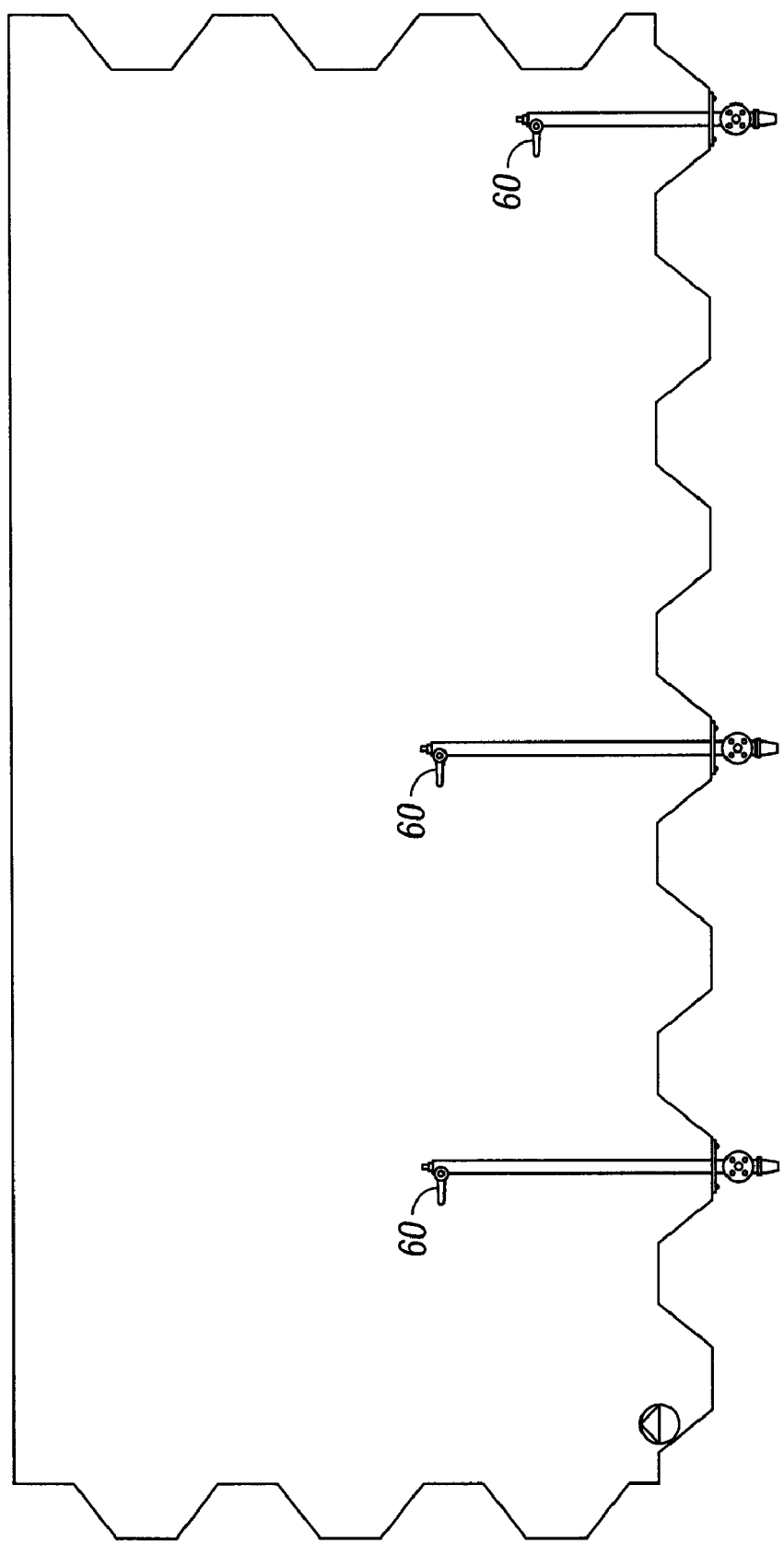
FIG. 4 is a schematic view of one embodiment of a washer nozzle head placement.
Figure 5:
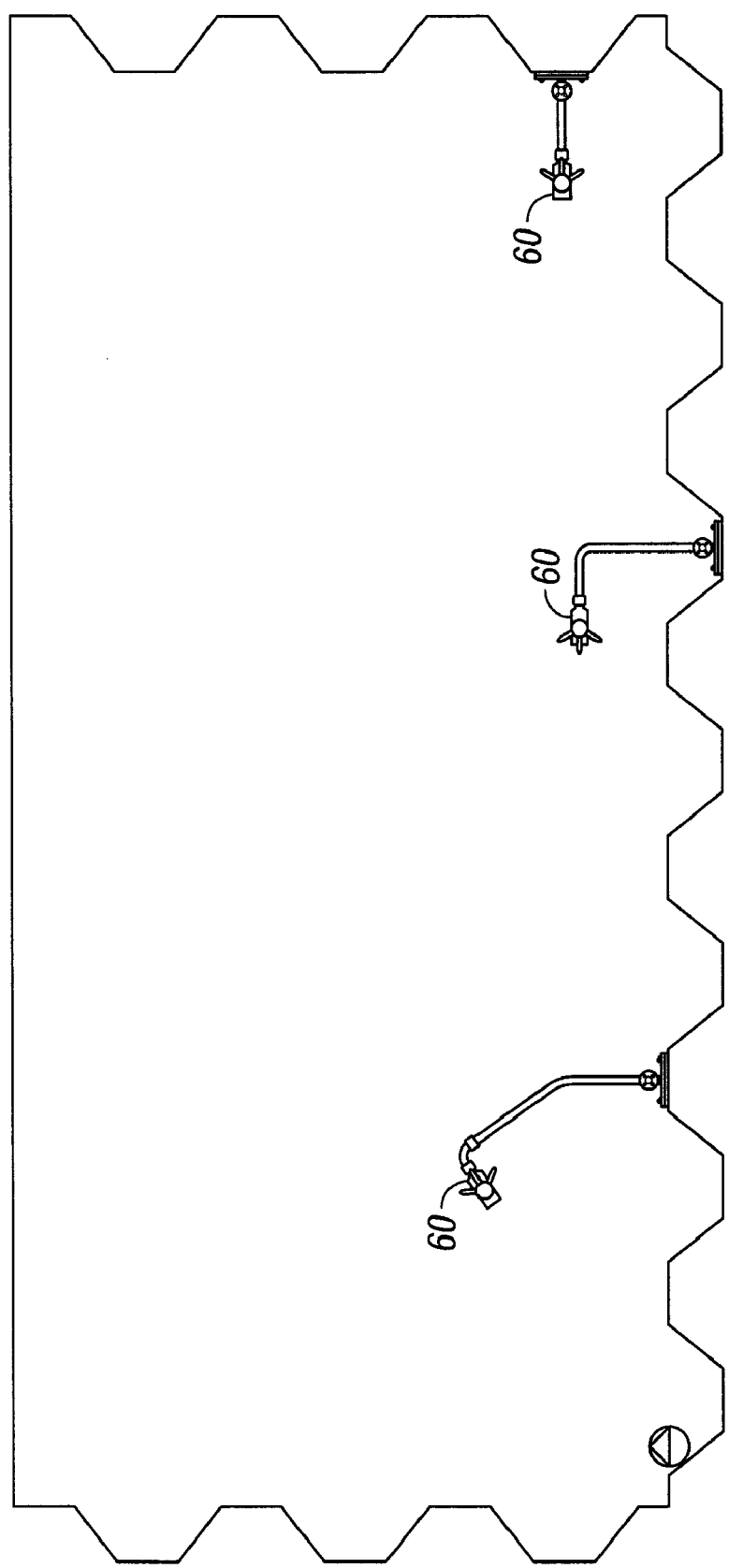
FIG. 5 is a schematic view of one embodiment of a washer nozzle head placement.

With reference to FIG. 4 and FIG. 5 the strategic positioning of the washers within the tank can be an important to maximize the cleaning action of the rotary jet heads. The list of factors taken into account in the placement of the rotary jet heads include: the design and nature of the effective cleaning area and pattern of the rotary jet heads; the position of the rotary jet head relative to the tank's surfaces to be cleaned; the presence or absence of bulkheads or other supporting structures; the presence of any "shadow" areas within the tank that may prove difficult to clean; the extent of wash overlap (i.e. areas of the tank that are washed by more than one of the rotary jet heads) desired; the areas of the tank where maximum cleaning is desired; the desirable pattern of washing towards the pump and other factors which will be apparent to one of skill in the art. It should be appreciated that each tank will have an optimum location pattern for the washer nozzles. This optimum pattern may be determined by taking into account the above noted factors, or alternatively by simple trial and error methods of temporarily locating the washers and running tests to optimize the washing effect.

With reference to FIG. 4 and FIG. 5 it should be noted that in some instances the rotary jet heads will be mounted on brackets and extension pipes above the surface of the tank to achieve the optimized washing effect. The use of tubing and brackets of various angles will necessarily depend upon the tank configuration as will be appreciated by one of skill in the art. As shown in FIG. 4 and FIG. 5. a change in the types of nozzles used (i.e. the nozzles spray pattern in one figure are "programmable" and in the second they are fixed) causes a change in the configuration of and placement of the nozzles. With the benefit of the present disclosure, one of skill in the art should be able to maximize the washing efficiency of the nozzles within a specific tank without undue experimentation.

While the claimed subject matter has been described with respect to a limited number of embodiments, those skilled in the art, having benefit of this disclosure, will appreciate that other embodiments can be devised which do not depart from the scope of the claimed subject matter as disclosed herein. Accordingly, the scope of the claimed subject matter should be limited only by the attached claims.

What is claimed is:

1. An apparatus for cleaning a tank having an inner surface and a bottom surface, the apparatus comprising:
    a water recycling tank including an inlet and a conically-shaped bottom having an outlet, wherein a weir separates a clean water compartment and a dirty water compartment;
    a cutting box in fluid communication with the outlet in the bottom of the water recycling tank including a portable weir bucket selectively suspended within the cutting box and having a top edge over which substantially solids-free fluid may flow, wherein the weir bucket defines a fluid collection area for the substantially solids-free fluid;
    a plurality of nozzles located within the tank, wherein each nozzle is in fluid communication with the clean water compartment and is operable to discharge clean fluid into the tank to dislodge solids affixed to the inner and bottom surfaces;
    a pump operable to pump fluid and dislodged solids from the bottom surface of the tank to the inlet of the water recycling tank
    a separator having an inlet for receiving liquid entering the clean water compartment from the dirty water compartment of the water recycling tank and providing effluent to the clean water compartment.

2. The apparatus of claim 1 wherein the fluid collection area in the cutting box is in fluid communication with the clean water compartment.

3. The apparatus of claim 2 wherein the separator is a hydrocyclone separator.

4. The apparatus of claim 2, further comprising:
    a modular fluid distribution manifold operable to control flow of fluid and dislodged solids from the tank to the inlet of the water recycling tank.

5. The apparatus of claim 4 wherein the flow of fluid and dislodged solids into the inlet of the water recycling tank is dissipated to prevent turbulence in the dirty water compartment.

6. The apparatus of claim 2, further comprising:
an overflow line directing cleaning fluid and separated oil above a maximum operational level of the dirty water compartment of the water recycling tank to the cutting box.

7. The apparatus of claim 6 wherein the water recycling tank has a minimum operational level below which fluid ceases to be communicated between the clean water compartment and the nozzles.

8. The apparatus of claim 1 further comprising:
an auger fed pump to selectively provide or stop fluid communication of solids from the outlet of the dirty water compartment to the cutting box.

9. The apparatus of claim 1 wherein the portable weir bucket in the cutting box has a weir bottom and a weir wall having a top edge defining a receptacle therein.

10. The apparatus of claim 9 wherein the portable weir bucket may be selectively raised and lowered within the cuttings box.

11. The apparatus of claim 9 further comprising:
an oil trap spaced apart from and parallel to the side of the portable weir bucket and retained above the bottom surface of the cutting box, wherein the oil trap includes a top edge located above the top edge of the weir wall and a bottom edge located below the top edge of the weir wall.

12. The apparatus of claim 1 further comprising:
a chemical inductor between the clean water compartment and the nozzles, wherein the chemical inductor provides cleaning compounds to the fluid directed to the nozzles.

13. An apparatus for cleaning a tank having an inner surface and a bottom surface, the apparatus comprising:
a water recycling tank including an inlet and a sloped bottom having an outlet with an auger fed pump operable to selectively provide fluid communication through the outlet, wherein a weir separates a clean water compartment and a dirty water compartment;
a cuttings box in fluid communication with the outlet in the bottom of the water recycling tank including a portable weir bucket selectively suspended within a cuttings box, wherein the weir bucket has a weir bottom and a weir wall having a top edge defining a fluid collection area for substantially solids-free fluid in fluid communication with the clean water compartment of the water recycling tank;
a hydrocyclone separator having an inlet for receiving liquid entering the clean water compartment from the dirty water compartment of the water recycling tank and providing substantially solids-free effluent to the clean water compartment and discharging solids to the cuttings box;
a plurality of nozzles located within the tank, wherein each nozzle is in fluid communication with the clean water compartment and is operable to discharge clean fluid into the tank to dislodge solids affixed to the inner and bottom surfaces;
a pump operable to pump fluid and dislodged solids from the tank to the inlet of the water recycling tank.

14. The apparatus of claim 13, wherein the water recycling tank has a minimum operational level in which fluid from the clean water compartment cannot be communicated to the nozzles; and wherein the water recycling tank has a maximum operational level in which fluid and separated oil from the dirty water compartment is communicated to the cuttings box through an overflow line.

15. The apparatus of claim 14 wherein the portable weir bucket may be selectively raised and lowered within the cuttings box.

16. The apparatus of claim 15 further comprising:
an oil trap spaced apart from and parallel to the side of the portable weir bucket and retained above the bottom surface of the cutting box, wherein the oil trap includes a top edge located above the top edge of the weir wall and a bottom edge located below the top edge of the weir wall.

17. The apparatus of claim 16, further comprising:
a chemical inductor between the clean water compartment and the nozzles, wherein the chemical inductor provides cleaning compounds to the fluid directed to the nozzles.

18. The apparatus of claim 16, further comprising:
a modular fluid distribution manifold operable to control flow of fluid and dislodged solids from the tank to the inlet of the water recycling tank.

19. A method of recycling water in a tank cleaning system comprising:
collecting tank slop from the dirty tank;
pumping the tank slop to a dirty water compartment of a water recycling tank;
collecting solids from the tank slop in a sloped bottom of the water recycling tank;
transmitting the solids from the bottom of the water recycling tank to a cuttings box;
pumping fluid entering a clean water compartment of the water recycling tank from the dirty water compartment of the water recycling tank to a hydrocyclonic separator;
separating finer solids from the fluid in the hydrocyclonic separator;
discharging the solids from the hydrocyclonic separator to the cuttings box;
transmitting effluent from the hydrocyclonic separator to a clean water compartment in the water recycling tank; and
pumping the fluid from the clean water compartment to at least one rotary jet head within the dirty tank.

20. The method of claim 19, further comprising:
collecting fluid in a portable weir bucket suspended in the cuttings box; and
pumping the fluid from inside the portable weir bucket to the clean water compartment of the water recycling tank.

21. The method of claim 20, further comprising:
directing fluid above a maximum operational level in the dirty water compartment of the water recycling tank to the cuttings box;
removing the portable weir bucket in the cuttings box when the cuttings box is full; and
replacing the portable weir in another cuttings box to be used in place of the full cuttings box.

* * * * *